(12) United States Patent
Chern et al.

(10) Patent No.: US 11,448,828 B2
(45) Date of Patent: Sep. 20, 2022

(54) OPTICAL DEVICE FOR COUPLING LIGHT

(71) Applicant: Taiwan Semiconductor Manufacturing Company, Ltd., Hsinchu (TW)

(72) Inventors: Chan-Hong Chern, Palo Alto, CA (US); Chih-Chang Lin, San Jose, CA (US); Chewn-Pu Jou, Hsinchu (TW); Chih-Tsung Shih, Hsinchu (TW); Feng-Wei Kuo, Hsinchu County (TW); Lan-Chou Cho, Hsinchu (TW); Min-Hsiang Hsu, Hsinchu (TW); Weiwei Song, San Jose, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/180,864

(22) Filed: Feb. 22, 2021

(65) Prior Publication Data
US 2022/0269006 A1    Aug. 25, 2022

(51) Int. Cl.
*G02B 6/30*    (2006.01)
*G02B 6/124*    (2006.01)
*G02B 6/293*    (2006.01)

(52) U.S. Cl.
CPC ............ *G02B 6/305* (2013.01); *G02B 6/124* (2013.01); *G02B 6/30* (2013.01); *G02B 6/29317* (2013.01)

(58) Field of Classification Search
None
See application file for complete search history.

(56) References Cited

U.S. PATENT DOCUMENTS

| | | | |
|---|---|---|---|
| 7,260,289 B1 * | 8/2007 | Gunn, III | G02B 6/124 385/37 |
| 9,453,969 B2 * | 9/2016 | Kobyakov | G02B 6/305 |
| 9,766,398 B2 * | 9/2017 | Kong | G02B 6/305 |
| 2007/0263973 A1 * | 11/2007 | Van Laere | G02B 6/124 385/129 |

(Continued)

FOREIGN PATENT DOCUMENTS

| | | |
|---|---|---|
| CN | 103901563 A * | 7/2014 |
| EP | 2626731 A1 * | 8/2013 |

OTHER PUBLICATIONS

Z. Cheng et al. Apodized focusing subwavelength grating couplers for suspended membrane waveguides. Applied Physics Letters 101, 101104(Sep. 4, 2012). (Year: 2012).*

(Continued)

*Primary Examiner* — Michael Stahl
(74) *Attorney, Agent, or Firm* — JCIPRNET

(57) ABSTRACT

An optical device for coupling light propagating between a waveguide and an optical transmission component is provided. The optical device includes a taper portion and a grating portion. The taper portion is disposed between the grating portion and the waveguide. The grating portion includes rows of grating patterns. A first size of a first grating pattern in a first row of grating patterns is larger than a second size of a second grating pattern in a second row of grating patterns. A first distance between the first row of grating patterns and the waveguide is less than a second distance between the second row of grating patterns and the waveguide.

20 Claims, 13 Drawing Sheets

(56) References Cited

U.S. PATENT DOCUMENTS

| | | | |
|---|---|---|---|
| 2009/0290837 A1* | 11/2009 | Chen | G02B 6/34 |
| | | | 385/37 |
| 2012/0224810 A1* | 9/2012 | Doerr | G02B 6/124 |
| | | | 385/37 |
| 2014/0314374 A1* | 10/2014 | Fattal | G02B 6/30 |
| | | | 385/33 |
| 2016/0246009 A1* | 8/2016 | Jiang | G02B 6/124 |
| 2017/0115456 A1* | 4/2017 | Sugama | G02B 6/30 |
| 2017/0138789 A1* | 5/2017 | Ivanov | G02B 6/305 |
| 2018/0095199 A1* | 4/2018 | Li | G02B 6/12004 |
| 2019/0094467 A1* | 3/2019 | Hassan | G02B 6/136 |

OTHER PUBLICATIONS

R. Halir et al. Waveguide grating coupler with subwavelength microstructures. Optics Letters, 34:9:1408-1410, May 1, 2009. (Year: 2009).*

S. Li et al. Deterministic design of focusing apodized subwavelength grating coupler based on weak form and transformation optics. Optics Express, 28:23:35395-35412, Nov. 9, 2020. (Year: 2020).*

Q. Zhong et al. Focusing-curved subwavelength grating couplers for ultra-broadband silicon photonics optical interfaces. Optics Express, 22:15:18224-18231, Jul. 21, 2014. (Year: 2014).*

A. Mizutani et al. A grating coupler with a trapezoidal hole array for perfectly vertical light coupling between optical fibers and waveguides. Applied Physics Express 10, 122501, Nov. 2017. https://doi.org/10.7567/APEX.10.122501 (Year: 2017).*

* cited by examiner

OPTICAL DEVICE FOR COUPLING LIGHT

BACKGROUND

Light offers many advantages when used as a medium for propagating information, the foremost of which are increased speed and bandwidth. Light can be propagated through planar waveguide structures as well as optical fibers. Planar waveguide structures are advantageous because they can be compactly incorporated together in or on a planar platform, i.e. substrate, to form planar packages analogous to integrated circuits (ICs). These structures in general are referred to as integrated optics. Integrated optical "chips" comprise a substrate on which or in which various integrated optical components or devices are formed. Planar waveguides analogous to conductor traces in semiconductor electronic ICs that are mounted in or on the substrate are employed to guide light to various optical, electro-optical, and optoelectronic devices or components on the chip.

In many applications, it is desirable that the optical signal being transmitted through the planar waveguide structure be optically coupled into or out of the integrated optical chip. These signals may, for example, be coupled to an optical fiber that is oriented out of the plane, i.e., above or below, the planar waveguide structure via a grating coupler. However, the bandwidth of the grating coupler is not satisfactory, and the coupling efficiency of a grating coupler may drop significantly if there is any wavelength shift due to variations from process, temperature, or light source.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
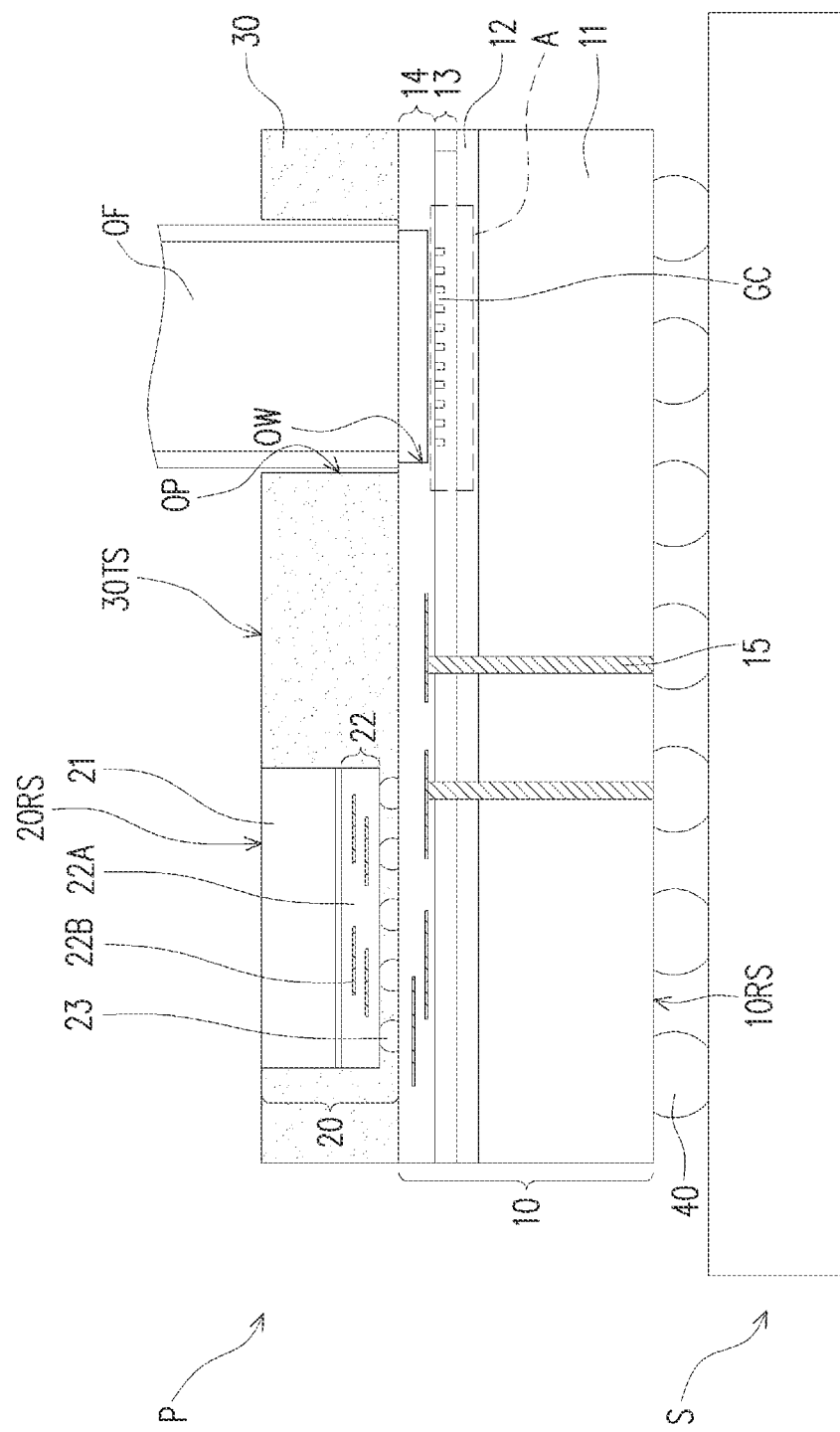
FIG. 1A is a cross-sectional view schematically illustrating a semiconductor device in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is cross-sectional views schematically illustrating a semiconductor device in accordance with some embodiments of the present disclosure. Referring to FIG. 1A, the package structure P includes a photoelectric integrated circuit die 10, an electric integrated circuit die 20, and an insulating encapsulant 30. The electric integrated circuit die 20 is over and electrically connected to the photoelectric integrated circuit die 10. The insulating encapsulant 30 laterally encapsulates the electric integrated circuit die 20.

In some embodiments, the package structure P is mounted on and electrically coupled to a substrate S. The substrate S may be or may include a package substrate, a printed circuit board (PCB), an interposer, and/or other circuit carrier that is capable of carrying integrated circuits.

The photoelectric integrated circuit die 10 may be or may include logic dies (e.g., central processing unit, microcontroller, etc.), system-on-chip (SoC) dies, or combinations thereof. In some embodiments, the photoelectric integrated circuit die 10 includes a semiconductor substrate 11, a dielectric layer 12 and a light-guiding material layer 13. The semiconductor substrate 11 may be or may include a bulk silicon substrate, a silicon germanium substrate, or a substrate formed of other semiconductor materials. The semiconductor substrate 11 may include other conductive layers or other semiconductor elements, such as transistors, diodes, resistors, capacitors or the like. In some embodiments, the dielectric layer 12 is formed over the semiconductor substrate 11, and a material of the dielectric layer 12 may include silicon oxide, silicon nitride, silicon oxynitride or other suitable dielectric materials. In some embodiments, the light-guiding material layer 13 is formed over the dielectric layer 12, and is configured for the transmission of optical signals.

In some embodiments, the light-guiding material layer 13 includes waveguides (not individually illustrated) and a grating coupler GC optically coupled to the waveguides. The grating coupler GC may serve as an optical input/output (I/O) device for the photoelectric integrated circuit die 10. The grating coupler GC may be configured to transmit optical signals between the light-guiding material layer 13 and an external optical element (such as an optical fiber OF). The materials of the waveguides and grating coupler GC of the light-guiding material layer 13 may be or may include silicon, or other suitable semiconductor materials.

The photoelectric integrated circuit die 10 may include various devices and circuits (not shown) that may be used for processing and transmitting optical signals and/or electrical signals. In some embodiments, the photoelectric integrated circuit die 10 further includes an interconnect structure 14 over the light-guiding material layer 13 and through semiconductor vias (TSVs) 15 electrically connected to the interconnect structure 14. In some embodiments, the interconnect structure 14 is electrically connected to the conductive layers or other semiconductor elements formed in the semiconductor substrate 11. The interconnect structure 14 formed on the semiconductor substrate 11 may include a dielectric layer and interconnect wirings embedded in the dielectric layer.

The electric integrated circuit die 20 may be or may include logic dies (e.g., central processing unit, microcontroller, etc.), memory dies (e.g., dynamic random access memory (DRAM) dies, static random access memory (SRAM) dies, etc.), power management dies (e.g., power management integrated circuit (PMIC) dies), radio frequency (RF) dies, micro-electro-mechanical-system (MEMS) dies, signal processing dies (e.g., digital signal processing (DSP) dies), front-end dies (e.g., analog front-end (AFE) dies), system-on-chip (SoC) dies, or combinations thereof. In some embodiments, the electric integrated circuit die 20 includes a semiconductor substrate 21 and an interconnect structure 22 over the semiconductor substrate 21. The semiconductor substrate 21 may be or may include bulk silicon substrate, a silicon germanium substrate, or a substrate formed of other semiconductor materials. The semiconductor substrate 21 may include other conductive layers or other semiconductor elements, such as transistors, diodes, resistors, capacitors or the like. In some embodiments, the interconnect structure 22 is electrically connected to the conductive layers or other semiconductor elements formed in the semiconductor substrate 21. The interconnect structure 22 formed on the semiconductor substrate 21 may include a dielectric layer 22A and interconnect wirings 22B embedded in the dielectric layer 22A.

In some embodiments, the electric integrated circuit die 20 is mounted onto and electrically connected to the photoelectric integrated circuit die 10 through a plurality of electrical terminals 23. The electrical terminals 23 may be or may include micro bumps, ball grid array (BGA) connectors, solder balls, metal pillars, controlled collapse chip connection (C4) bumps, electroless nickel-electroless palladium-immersion gold (ENEPIG) formed bumps, or the like. Other possible forms and shapes of the electrical terminals 23 may be utilized according to design requirements.

In the embodiment shown in FIG. 1A, the insulating encapsulant 30 is disposed over the photoelectric integrated circuit die 10 to encapsulate the electric integrated circuit die 20. The insulating encapsulant 30 may laterally encapsulate the electric integrated circuit die 20 and a rear surface 20RS of the electric integrated circuit die 20 may be revealed from and substantially leveled with a top surface 30TS of the insulating encapsulant 30. In some embodiments, the insulating encapsulant 30 includes a base material and filler particles distributed in the base material. In some embodiments, the material of the base material includes epoxy resins, phenolic resins or silicon-containing resins, or the like, and the material of the filler particles includes silica, alumina, zinc oxide, titanium dioxide, or the like. However, in some alternative embodiments, the insulating encapsulant 30 is formed by a deposition process, and the insulating encapsulant 30 includes silicon oxide, silicon nitride, silicon oxynitride or other suitable dielectric materials.

Referring to FIG. 1A, the interconnect structure 14 in the photoelectric integrated circuit die 10 may allow optical transmission between the photoelectric integrated circuit die 10 and an external element (e.g., an optical fiber OF). The interconnect structure 14 may be provided with an optical window OW directly over the grating coupler GC to facilitate optical transmission. As shown in FIG. 1, the insulating encapsulant 30 has an opening OP on top of the optical window OW of the photoelectric integrated circuit die 10.

In some embodiments, an optical fiber OF is optically coupled to the photoelectric integrated circuit die 10. The optical fiber OF may be optical coupled to the grating coupler GC of the photoelectric integrated circuit die 10. It is appreciated that the configuration of the optical fiber OF shown in FIG. 1A is schematic, and in some embodiments, a coupling element (not shown) may be used to secure the optical fiber OF, and the coupling element and the optical fiber OF may be attached to the photoelectric integrated circuit die 10 or an intermediary waveguide element (not shown) through adhesive films, such as optical clear adhesive or other suitable optical glue/grease.

The package structure P may further include a plurality of electrical terminals 40 may be disposed over the rear surface 10RS of photoelectric integrated circuit die 10 to be electrically connected to the TSVs 15 of the photoelectric integrated circuit die 10. The electrical terminals 40 may be or may include micro bumps, ball grid array (BGA) connectors, solder balls, metal pillars, controlled collapse chip connection (C4) bumps, electroless nickel-electroless palladium-immersion gold (ENEPIG) formed bumps, or the like. Other possible forms and shapes of the electrical terminals 40 may be utilized according to design requirements. In some alternative embodiments, the electrical terminals 40 may be electrically connected to the TSVs 15 of the photoelectric integrated circuit die 10 through a redistribution circuit layer (not shown) between the photoelectric integrated circuit die 10 and the electrical terminals 40. The redistribution circuit layer (not shown) may include a plurality of dielectric layers and a plurality of redistribution layers stacked alternately.

The semiconductor device shown in FIG. 1A is an exemplary semiconductor device in accordance with some embodiments of the present disclosure, semiconductor devices with other suitable arrangements and with photoelectric integrated circuit dies of other suitable configurations are within the contemplated scope of the disclosure.

Figure 1B:
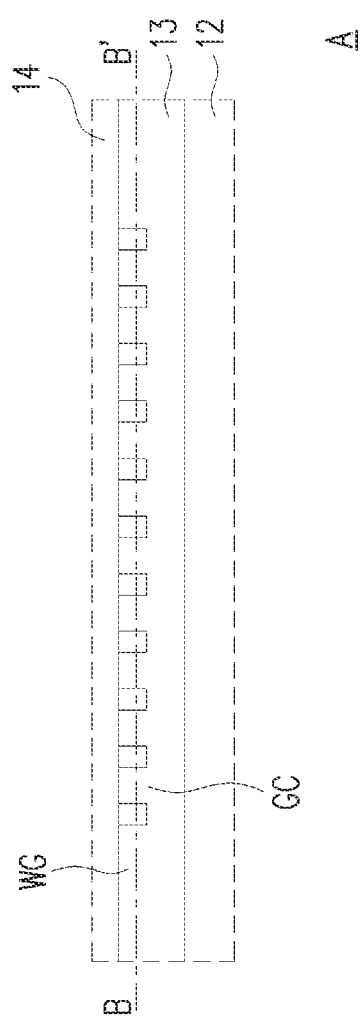
FIG. 1B is an enlarged view of a portion of the semiconductor device in FIG. 1A.
Figure 2:
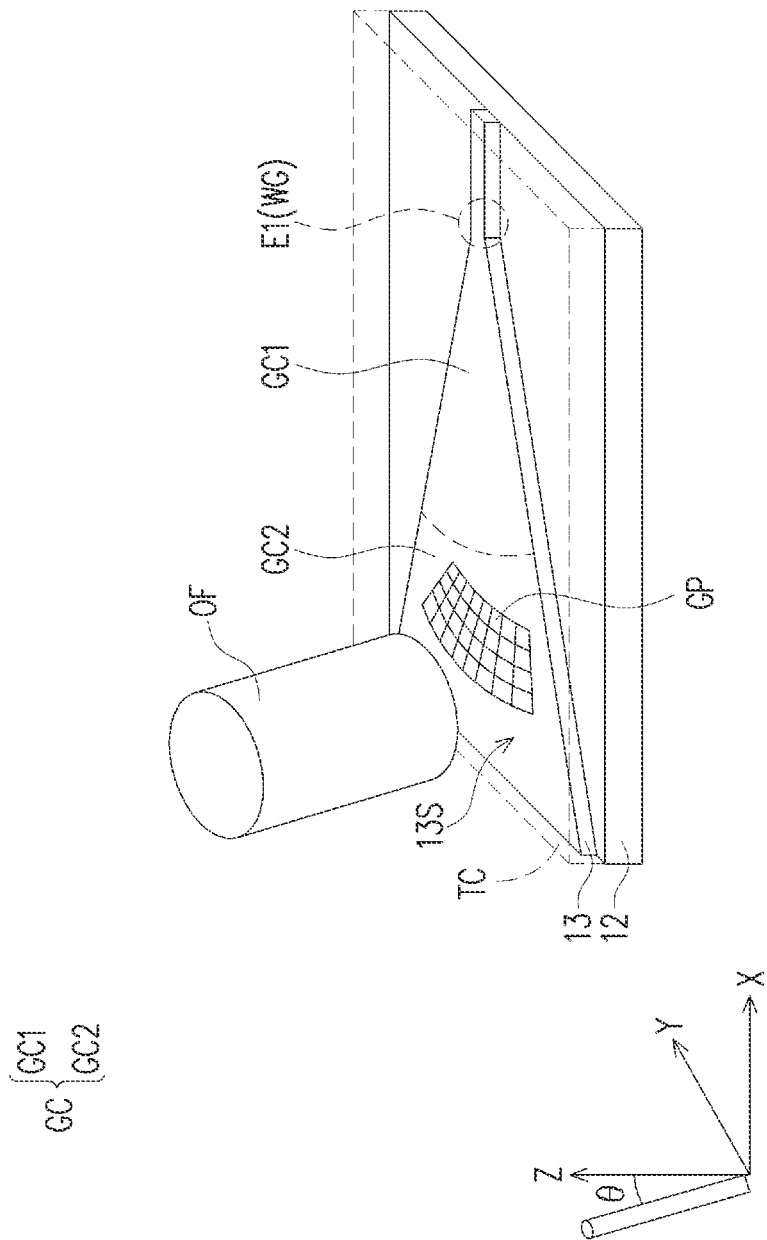
FIG. 2 is a perspective view schematically illustrating a semiconductor structure in accordance with some embodiments of the present disclosure.

FIG. 1B is an enlarged view of a portion of the photoelectric integrated circuit die 10 of the package structure P marked by the dashed box A in FIG. 1A. FIG. 2 illustrates a perspective view of a semiconductor structure similar to the semiconductor structure shown in FIG. 1B in another perspective of view. Referring to FIG. 2, the light-guiding material layer 13 is disposed atop the dielectric layer 12. The light-guiding material layer 13 includes a waveguide WG and a grating coupler GC. In some embodiments, the light-guiding material layer 13 has an upper surface 13S facing the optical fiber OF. The light-guiding material layer 13 may be made of material having high refractive indexes for desired wavelength. For example, the light-guiding material layer 13 may be or may include silicon such that the light-guiding material layer 13 may have high refractive indexes for infrared light (e.g., light having a wavelength larger than about 700 nm). The dielectric layer 12 may function as a bottom cladding layer for the light-guiding material layer 13. As described previously with respect to FIG. 1A, a material of the dielectric layer 12 may include silicon oxide, silicon nitride, silicon oxynitride or other suitable dielectric materials. In some embodiments, the dielectric layer 12 is a buried oxide layer sandwiched between a semiconductor substrate (e.g., semiconductor substrate 11 shown in FIG. 1A) and the light-guiding material layer 13, and the dielectric layer 12 and the light-guiding material layer 13 may be made from a silicon on insulator (SOI) wafer. Other suitable materials are within the contemplated scope of the disclosure.

In some embodiments, the waveguide WG and the grating coupler GC are further covered with a top cladding layer TC. In some embodiments, the top cladding layer TC includes silicon oxide. In some embodiments, the top cladding layer TC can include other types of dielectric materials according to different applications, including polycrystalline silicon and silicon nitride. The top cladding layer TC is presented in a see-through manner in FIG. 2, such that the waveguide WG and the grating coupler GC can be shown.

As shown in FIG. 2, an end portion E1 of the waveguide WG is arranged along a first direction, for example, along the x-direction. The waveguide WG may be silicon waveguide of sub-micron dimension. For example, the waveguide WG may be silicon waveguide having a height of about 200 nm to 350 nm and a width of about 370 nm to 470 nm.

The semiconductor structure shown in FIG. 2 is for receiving light from or outputting light to an optical fiber OF. The grating coupler GC may be a one-dimensional (1D) grating coupler. As illustrated in FIG. 2, the grating coupler GC includes a first portion GC1 and a second portion GC2. The first portion GC1 is optically coupled to the end portion E1 of the waveguide WG. The second portion GC2 is optically coupled to the first portion GC1, and the second portion GC2 is optically coupled to the optical fiber OF. The first portion GC1 may be a taper portion. The width of the first portion GC may increase as away from the waveguide WG, such that the mode field of the light from the waveguide WG may be expanded. The second portion GC2 may be a grating portion. The second portion GC2 may include grating patterns GP.

In some embodiments, a light from the waveguide WG may be directed to the optical fiber OF through the grating coupler GC, and a light from the optical fiber OF may be directed to the waveguide WG through the grating coupler GC. As shown in FIG. 2, in the embodiment which the grating coupler GC is arranged substantially on a plane parallel to the xy-plane, and the optical fiber OF may be arranged at an angle θ, e.g., about 5° to 15°, or about 8° to 10°, relative to the z-direction.

Despite showing a single waveguide WG and a single grating coupler GC in FIG. 1A and FIG. 2, more than one waveguides and grating couplers may be included in a package structure, e.g., package structure P shown in FIG. 1A, the numbers of the waveguide and the grating coupler are not limited by the disclosure. The waveguide WG may further be optically coupled to one or more additional photonic integrated circuits components (not shown). The one or more photonic integrated circuits components can include, for example, one or more of a second grating coupler, a photodetector, a modulator, a polarizer, a beam splitter, a coupler, a reflector, an optical amplifier, a filter, an interferometer, etc. The one or more photonic integrated circuits components can include active components, passive components or a combination of active and passive components.

Figure 3A:
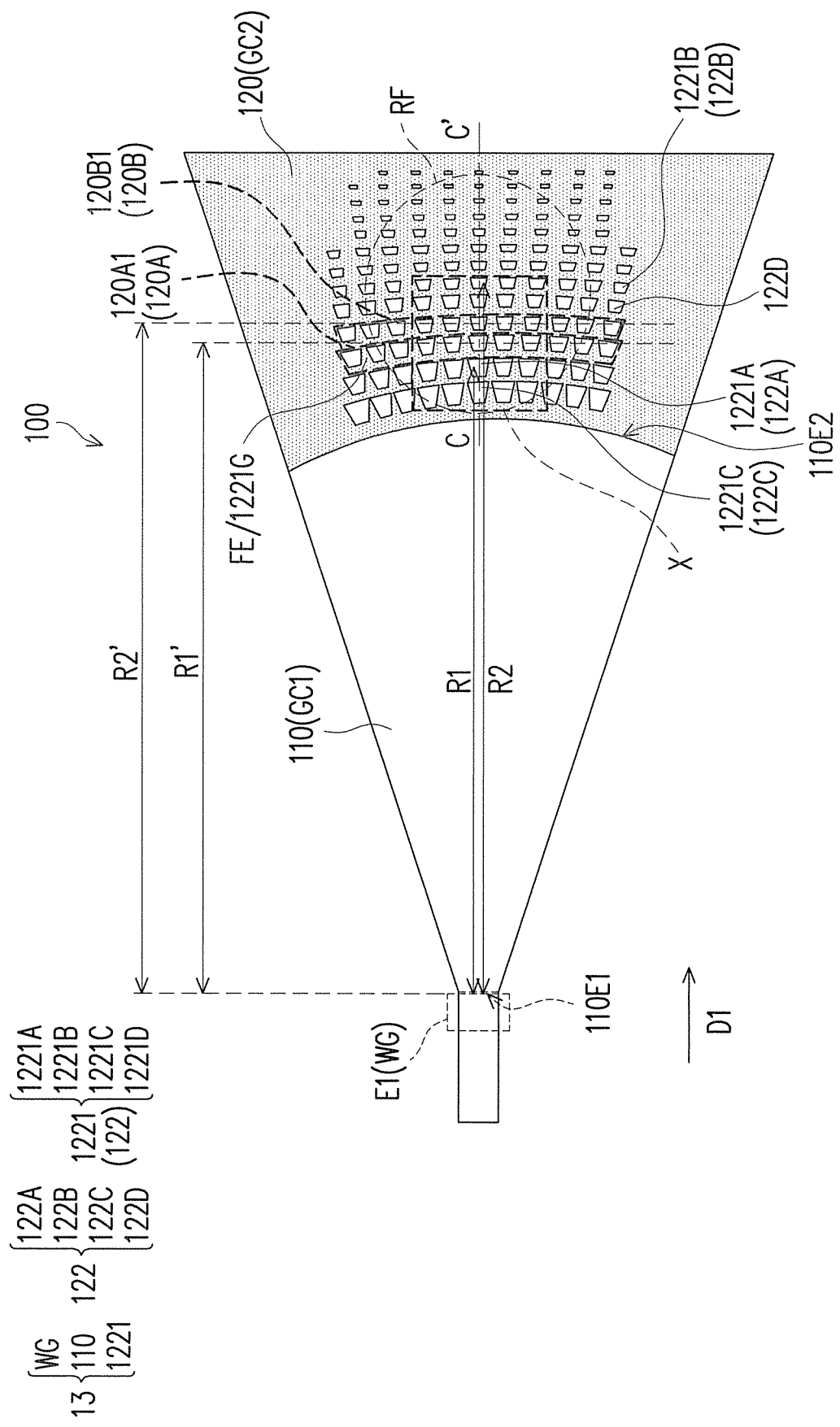
FIG. 3A is a schematic view of a semiconductor structure in accordance with some embodiments of the present disclosure.
Figure 3B:
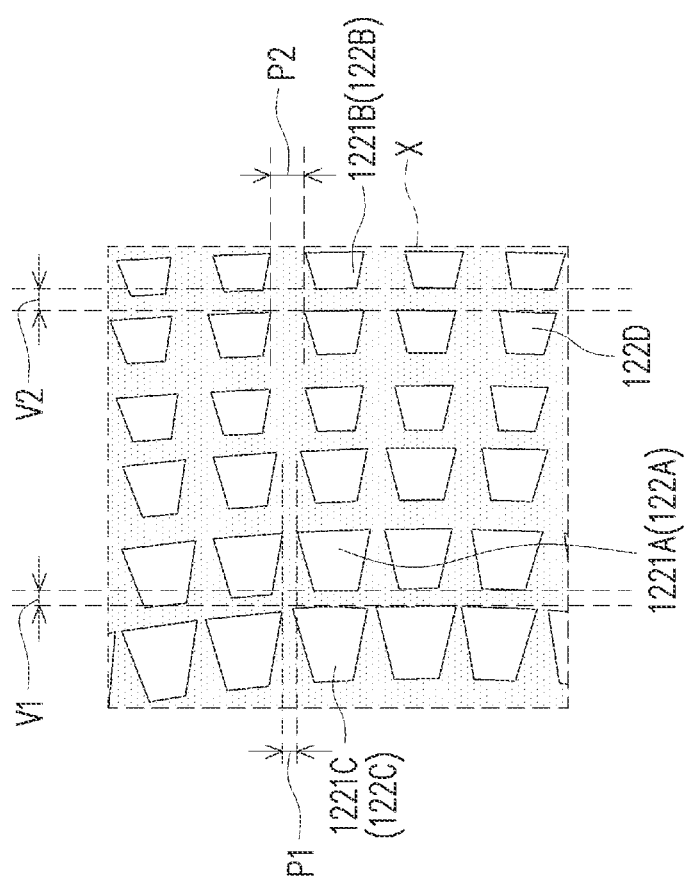
FIG. 3B is an enlarged view of the semiconductor structure in FIG. 3A.
Figure 3C:
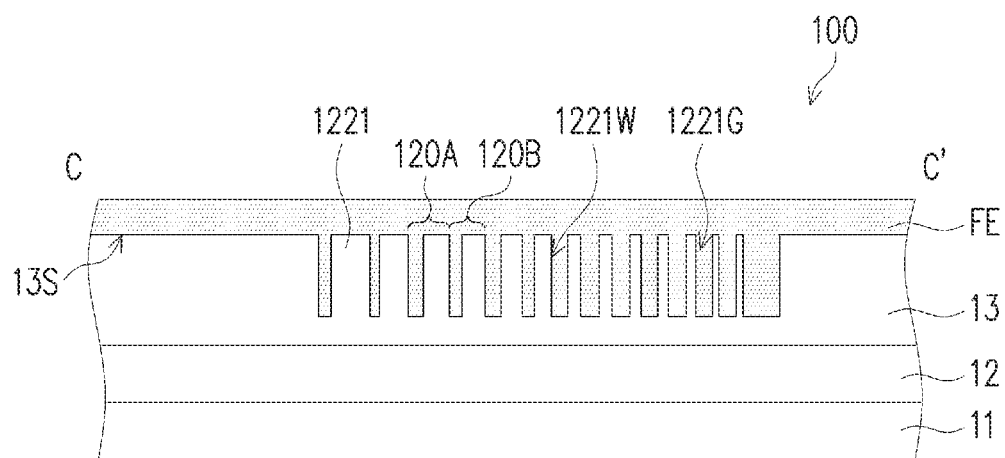
FIG. 3C is a cross-sectional view of the semiconductor structure in FIG. 3A.

FIG. 3A is a schematic view of a semiconductor structure in accordance with some embodiments of the present disclosure. The cross-section view in FIG. 3A is a cross-section view similar to that of semiconductor structure in FIG. 1B along line B-B'. FIG. 3B illustrates an enlarged view of the semiconductor structure in FIG. 3A. FIG. 3C is a cross-sectional view of the semiconductor structure in FIG. 3A along line C-C'.

Referring to FIG. 3A, the semiconductor structure may include a waveguide WG and a grating coupler 100. The grating coupler 100 may be for coupling light propagating between a waveguide WG and an optical transmission component, e.g., an optical fiber similar to the optical fiber OF in FIG. 1A. The grating coupler 100 may include a taper portion 110 and a grating portion 120. The taper portion 110 may be similar to the first portion GC1 in FIG. 2. The grating portion 120 may be similar to the second portion GC2 in FIG. 2. As shown in FIG. 3A, the taper portion 110 is disposed between the grating portion 120 and the waveguide WG, and the grating portion 120 (the second portion GC2) includes rows of grating patterns 122.

A row of grating patterns 122 may include a plurality of grating patterns 1221 arranged in series. By "row of grating patterns" or "arranged in series", it is not intended that the grating patterns 1221 to be arranged along a straight line. The rows of grating patterns 122 and the grating patterns 1221 within each of the rows of grating patterns 122 are arranged in an organized manner, such that the rows of grating patterns 122 may function as a diffraction grating to direct light from the waveguide WG upwardly to an external optical element, e.g., the optical fiber OF shown in FIG. 1A or FIG. 2. In some embodiments, the grating patterns 1221 are subwavelength grating patterns, and the dimensions of the grating patterns 1221 are less than the wavelength of interest, e.g., 1310 nm or 1550 nm.

As shown in FIG. 3A, the rows of grating patterns 122 may include a first row of grating patterns 122A and a second row of grating patterns 122B. A first distance R1 between the first row of grating patterns 122A and the waveguide WG is less than a second distance R2 between the second row of grating patterns 122B and the waveguide WG. The first distance R1 may be determined by a distance from the end portion E1 of the waveguide WG to the center of a central grating pattern of the first row of grating patterns 122A, and the second distance R2 may be determined by a distance from the end portion E1 of the waveguide WG to the center of a central grating pattern of the second row of grating patterns 122B.

In some embodiments, a first size of a first grating pattern 1221A in a first row of grating patterns 122A is larger than a second size of a second grating pattern 1221B in a second row of grating patterns 122B. In other words, grating patterns 1221 in a row of grating patterns 122 farther away from the waveguide WG may have a smaller size, such that more cladding material may be filled in the grating portion 120 to provide a smaller effective refractive index. By arranging the grating portion 120 with a gradually decreasing effective refractive index, the light from waveguide may be more focused and the grating coupler 100 may have a broader bandwidth.

In the embodiment shown in FIGS. 3A and 3C, a first projection area of the first grating pattern 1221A on a substrate (e.g., the dielectric layer 12), for example, the area of the trapezoid-shape pattern marked by 1221A in FIG. 3A, of the semiconductor structure may be larger than a second projection area of the second grating pattern 1221B on the substrate (e.g., the dielectric layer 12), for example, the area of the trapezoid-shape pattern marked by 1221B in FIG. 3A, of the semiconductor structure. However, the embodiments disclosed are not limited to the shape of the grating patterns described above.

FIG. 3B illustrates an enlarged view of the portion X of the semiconductor structure in FIG. 3A marked by a dashed box. Referring to FIGS. 3A and 3B, in some embodiments, a first interval V1 between first rows of grating patterns 122A and 122C among the rows of grating patterns is smaller than a second interval V2 between second rows of grating patterns 122B and 122D among the rows of grating patterns. In other words, an interval between a row of grating patterns 122 and an adjacent row of grating patterns may be wider as the row of grating patterns 122 being farther away from the waveguide WG, such that more cladding material may be filled in the grating portion 120 to provide a smaller effective refractive index. By arranging the grating portion 120 with a gradually decreasing effective refractive index, the light from waveguide may be more focused and the grating coupler 100 may have a broader bandwidth.

The grating portion 120 (the second portion GC2) may include a first grating structure 120A and a second grating structure 120B, arranged side-by-side with each other along the first direction D1. Each of the first grating structure 120A and the second grating structure 120B includes a row of grating patterns 122. In other words, the first grating structure 120A may include a row of grating patterns 122 and an interval between the row of grating patterns 122 and an adjacent row of grating patterns closer to the waveguide WG. Viewing from another perspective, the first grating structure 120A may include a plurality of grating patterns 1221 arranged in series and gaps 1221G between the grating patterns 1221. Similar descriptions are also applicable to the second grating structure 120B. As shown in FIG. 3A, the grating portion 120 may include more than two grating structures.

The semiconductor structure may further include a filling element FE. As shown in FIGS. 3A and 3C, the filling element FE is filled in the gaps 1221G between the grating patterns 1221. The filling element FE may include silicon oxide or other types of dielectric materials according to different applications, including polycrystalline silicon and silicon nitride. In some embodiments, the filling element FE may be a portion of the top cladding layer TC as discussed in FIG. 2.

As shown in FIG. 3A, a first distance R1' between the first grating structure 120A and the end portion E1 of the waveguide WG is less than a second distance R2' between the second grating structure 120B and the end portion E1 of the waveguide WG. The first distance R1' may be determined by a distance from the end portion E1 of the waveguide WG to the center of the first grating structure 120A, and the second distance R2' may be determined by a distance from the end portion E1 of the waveguide WG to the center of the second grating structure 120B.

Referring to FIGS. 3A and 3C, in some embodiments, a first ratio of a sum of projection areas of the grating patterns 1221 on the upper surface 13S to a projection area of the filling element FE on the upper surface 13S of the first grating structure 120A is greater than a second ratio of a sum of projection areas of the grating patterns on the upper surface 13S to a projection area of the filling element FE on the upper surface 13S of the second grating structure. For example, in the embodiment shown in FIG. 3A, the first ratio is the ratio of the sum of the areas of the trapezoid-shape patterns within the region representing the first grating structure 120A to the area of the rest of the region, and the second ratio is the ratio of the sum of the areas of the trapezoid-shape patterns within the region representing the second grating structure 120B to the area of the rest of the region. With such arrangement, the grating structure farther away from the waveguide WG may have more filling element in terms of the proportion of the volume of the filling element to that of the light-guiding material within a specific grating structure, in order to provide a smaller effective refractive index. By arranging the grating portion 120 with a gradually decreasing effective refractive index, the light from waveguide may be more focused and the grating coupler 100 may have a broader bandwidth. However, the embodiments disclosed are not limited to the shape of the grating patterns described above.

Referring to FIGS. 3A and 3C, the filling element FE may be made from materials different from that of the light-guiding material layer 13. In some embodiments, the refractive index of the filling element FE is smaller than the refractive index of the light-guiding material layer 13. In some embodiments, a first effective refractive index of the first grating structure 120A is larger than a second effective refractive index of the second grating structure 120B.

Referring to FIG. 3A. In some embodiments, the taper portion 110 connects to the waveguide WG at a first edge 110E1. In some embodiments, the taper portion 110 has a second edge 110E2 opposite to the first edge 110E1, and the second edge 110E2 is an arc-shaped edge.

In some embodiments, the grating patterns 1221 in one of the rows of grating patterns 122, e.g., the first row of grating patterns 122A are arranged along an arc, such arrangement may facilitate the focusing of the light to a center in the grating portion 120. The grating patterns 1221 in the rows of grating patterns 122 may be arranged to be conformed to the shape of the second edge 110E2 of the taper portion 110 to facilitate the mode field matching. The grating patterns 1221 may be trapezoid-shape patterns as shown in FIG. 3A, such that the grating patterns 1221 may be arranged to be more fit to the shape of the second edge 110E2 of the taper portion 110. However, the grating patterns 1221 can be rectangular-shape, circle-shape, triangle-shape, or square-shape patterns. Patterns with any other suitable shape are within the contemplated scope of the disclosure.

In some embodiments, each of the first grating structure 120A and the second grating structure 120B has an arc-shaped edge. As shown in FIG. 3A, the first grating structure 120A has an arc-shaped edge 120A1, and the second grating structure 120B has an arc-shaped edge 120B1. The first grating structure 120A and the second grating structure 120B may be joined at the arc-shaped edge 120A1 of the first grating structure 120A. In some embodiments, the grating patterns 1221 in the row of grating patterns 122 of the first grating structure 120A are arranged along the arc-shaped edge 120A1 of the first grating structure 120A.

Referring to FIGS. 3A and 3B. In some embodiments, the grating patterns 1221A in the first row of grating patterns 122A are of the same size. In some embodiments, pitches P1 between each one of the grating patterns and an adjacent grating pattern in the first row of grating patterns 122A are fixed. The pitch between a grating pattern 1221 and an adjacent grating pattern may be determined by the minimum distance between the two adjacent grating patterns 1221. For example, as shown in FIG. 3B, the pitch P1 between the first grating patterns 1221A and the adjacent grating pattern in the first row of grating patterns 122A may be determined by the minimum distance between the first grating patterns 1221A and the adjacent grating pattern. In some embodiments, the first grating pattern 1221A is aligned to an adjacent grating pattern 1221C in an adjacent row of grating patterns 122C. As such, the grating patterns in the first row of grating patterns 122A may form a more organized pattern.

In some embodiments, the first pitch P1 between the first grating pattern 1221A and an adjacent grating pattern in the first row of grating patterns 122A is smaller than a second pitch P2 between the second grating pattern 1221B and an adjacent grating pattern in the second row of grating patterns 122B. In other words, in a region of the grating portion 120 farther away from the waveguide WG, the grating patterns 1221 are more sparsely disposed.

As shown in FIG. 3A, a region RF located in the grating portion 120 would be covered by a core of the optical fiber when the grating coupler 100 is optically coupled to the optical fiber. The region RF may be the projection of the input/output surface of the core of the optical fiber on the cross-section of the grating coupler 100 shown in FIG. 3A. In some embodiments, the rows of grating patterns 122 may be arranged to substantially cover the region RF and an outer ring portion thereof. As such, the grating patterns 1221 may be arranged corresponding to the core of the optical fiber to achieve higher coupling efficiency while providing positioning error tolerance.

FIG. 3C illustrates a cross-sectional view of the semiconductor structure in FIG. 3A. The dielectric layer 12 is over the semiconductor substrate 11. The light-guiding material layer 13 is over the dielectric layer 12. The gaps 1221G between the grating patterns 1221 may be recesses from the upper surface 13S of the light-guiding material layer 13, and filling element FE atop the light-guiding material layer 13 may extend into the gaps 1221G such that the filling element FE can be filled in the gaps 1221G between the grating patterns 1221. In the embodiment shown in FIG. 3C, the sidewalls 1221W of the gaps 1221G are substantially vertical.

Figure 3D:
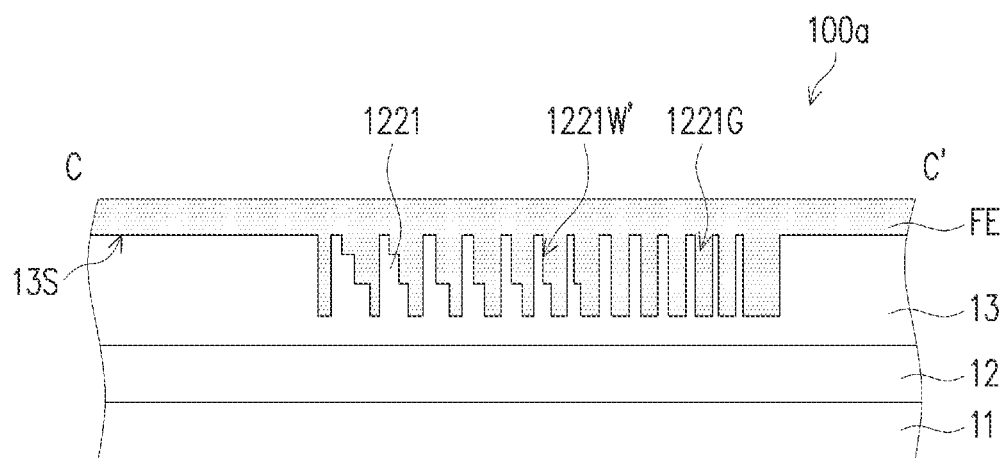
FIG. 3D illustrates a cross-sectional view of another semiconductor structure similar to the semiconductor structure in FIG. 3A in accordance with some embodiments of the present disclosure.

FIG. 3D illustrates a cross-sectional view of another semiconductor structure similar to the semiconductor structure in FIGS. 3A and 3C. The grating coupler 100a illustrated in FIG. 3D is similar to the grating coupler 100 illustrated in FIG. 3C except that in the embodiment, the sidewalls 1221W' of the gaps 1221G may be step-shaped. The mode field matching between the grating region and the optical fiber may be further enhanced by the step-shaped sidewalls 1221W', and the amount of diffracted light directed to the optical fiber may be further increased. In some embodiments, more steps may be formed on a sidewall of a gap between grating patterns of a larger size. The step-shaped sidewalls 1221W' may be formed through multi-stage etching of the light-guiding material layer 13.

Figure 4:
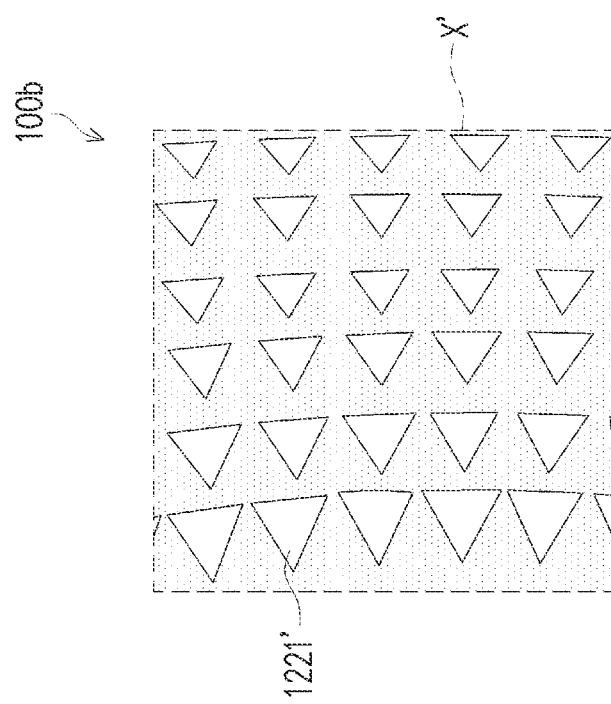
FIG. 4 illustrates an enlarged view of another semiconductor structure similar to the semiconductor structure in FIGS. 3A and 3B in accordance with some embodiments of the present disclosure.

FIG. 4 illustrates an enlarged view of a portion X' of another semiconductor structure similar to the portion X in FIGS. 3A and 3B. The grating coupler 100b illustrated in FIG. 4 is similar to the grating coupler 100 illustrated in FIGS. 3A and 3B except that in the embodiment, the grating patterns 1221' are triangular-shape pattern.

Figure 5A:
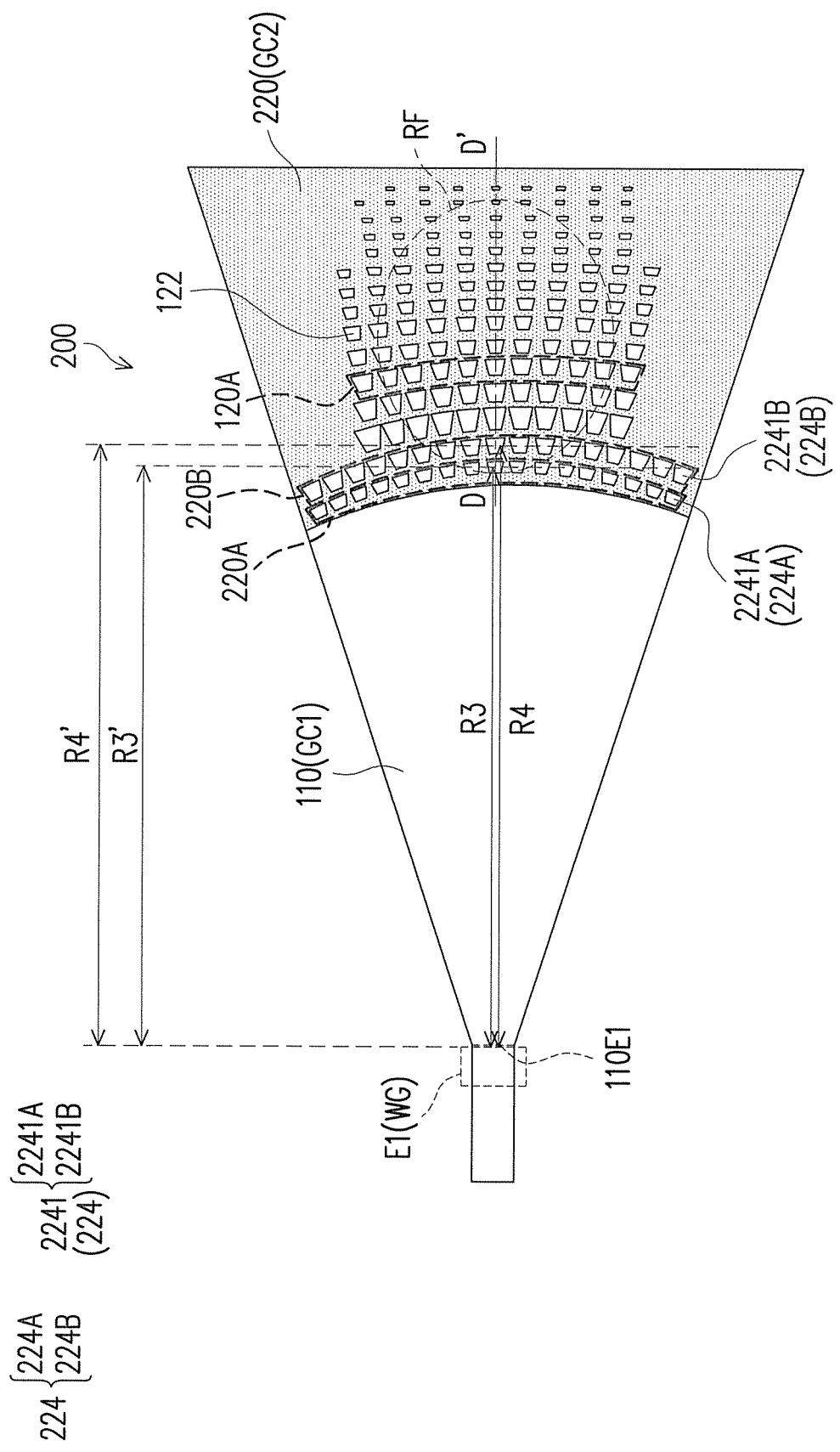
FIG. 5A is a schematic view of a semiconductor structure in accordance with some embodiments of the present disclosure.
Figure 5B:
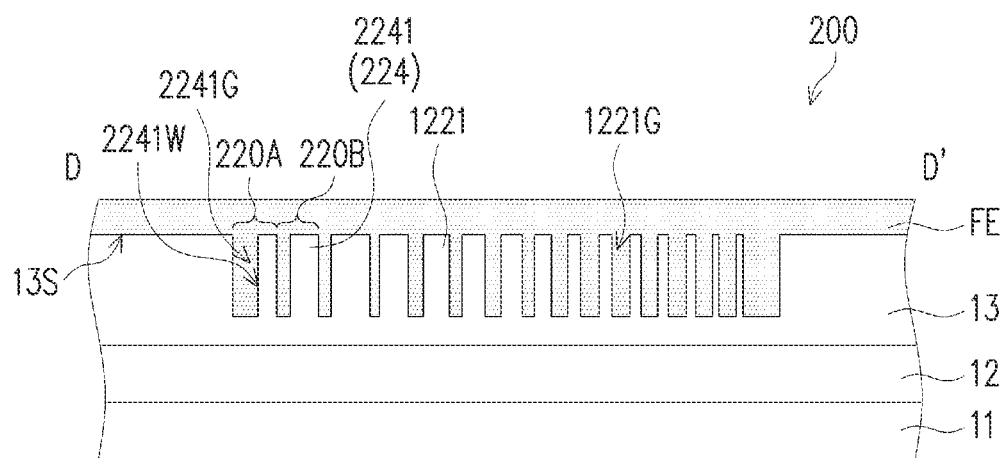
FIG. 5B is a cross-sectional view of the semiconductor structure in FIG. 5A.

FIG. 5A illustrates a schematic view of a semiconductor structure in accordance with some embodiments of the present disclosure. FIG. 5B illustrates a cross-sectional view of the semiconductor structure in FIG. 5A along line D-D'. Referring to FIG. 5A. The grating coupler 200 illustrated in FIG. 5A is similar to the grating coupler 100 illustrated in FIG. 3A except that in the embodiment, the grating portion 220 (or, the second portion GC2) may further include rows of modulating patterns 224 disposed between the taper portion 110 and the rows of grating patterns 122. A row of modulating patterns 224 may include a plurality of modulating patterns 2241 arranged in series. By "row of modulating patterns" or "arranged in series", it is not intended that the modulating patterns 2241 be arranged along a straight line. In some embodiments, the modulating patterns 2241 in one of the rows of modulating patterns 224 may be arranged along an arc. The modulating patterns 2241 may be trapezoid-shape patterns as shown in FIG. 5A. However, the modulating patterns 2241 can be rectangular-shape, circle-shape, triangle-shape, or square-shape patterns. Patterns with any other suitable shape are within the contemplated scope of the disclosure.

As shown in FIG. 5A, the rows of modulating patterns 224 may include a first row of modulating patterns 224A and a second row of modulating patterns 224B, wherein a third distance R3 between the first row of modulating patterns 224A and the waveguide WG is less than a fourth distance R4 between the second row of modulating patterns 224B and the waveguide WG. In some embodiments, a third size of a first modulating pattern 2241A in the first row of modulating patterns 224A is smaller than the fourth size of a second modulating pattern 2241B in a second row of modulating patterns 224B. The rows of modulating patterns as stated above may further expand the mold field of the light transferring form the waveguide to facilitate the mode field matching of the light between the waveguide and the fiber.

Viewing from another perspective, the second portion GC2 may include a first modulating structure 220A and a second modulating structure 220B disposed between the first portion GC1 and the first grating structure 120A. The first modulating structure 220A may include a first row of modulating patterns 224A, and the second modulating structure 220A may include a second row of modulating patterns 224B. As shown in FIG. 5A, a third distance R3' between the first modulating structure 220A and the end portion E1 of the waveguide WG is less than a fourth distance R4' between the second modulating structure 220B and the end portion E1 of the waveguide WG. In some embodiments, a third size of a first modulating pattern 2241A in the first row of modulating patterns 224A is smaller than a fourth size of a second modulating pattern 2241B in the second row of modulating patterns 224B.

Referring to FIGS. 5A and 5B. The first modulating structure 220A and the second modulating structure 220B may each include a plurality of modulating patterns 2241 arranged in series and gaps 2241G between the modulating patterns 2241. As shown in FIG. 5B, the filling element FE fills in the gaps 2241G between the modulating patterns 2241. In some embodiments, a third ratio of a sum of projection areas of the modulating patterns 2241 on the upper surface 13S to a projection area of the filling element FE on the upper surface 13S of the first modulating structure 220A is smaller than a fourth ratio a sum of projection areas of the modulating patterns 2241 on the upper surface 13S to a projection area of the filling element FE on the upper surface 13S of a second modulating structure.

FIG. 5B illustrates a cross-sectional view of the semiconductor structure in FIG. 5A. The grating coupler 200 illustrated in FIG. 5B is similar to the grating coupler 100 illustrated in FIG. 3C except that the grating coupler 200 may further include modulating patterns 2241. The gaps 2241G between the modulating patterns 2241 may be recesses from the upper surface 13S of the light-guiding material layer 13, and filling element FE atop the light-guiding material layer 13 may extend into the gaps 2241G such that the filling element FE may be filled in the gaps 2241G between the modulating patterns 2241. In the embodiment shown in FIG. 5B, the sidewalls 2241W of the gaps 2241G are substantially vertical.

Figure 5C:
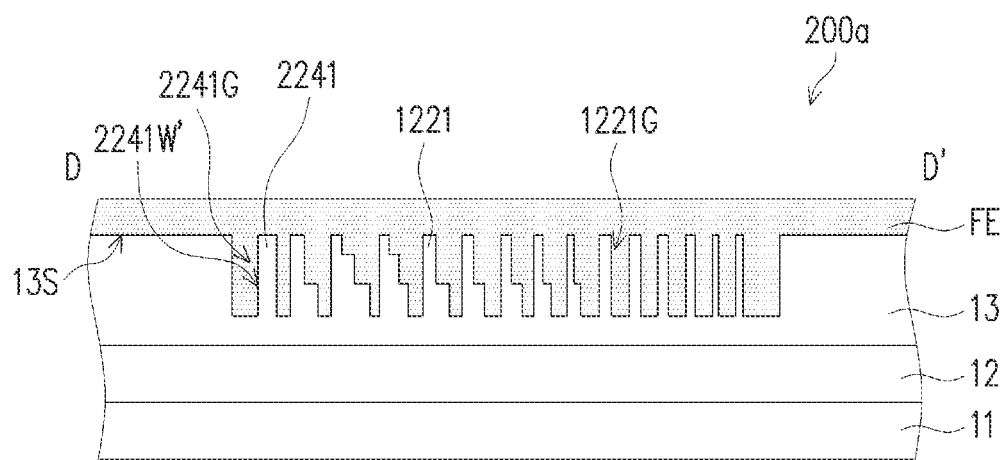
FIG. 5C illustrates a cross-sectional view of another semiconductor structure similar to the semiconductor structure in FIG. 5A in accordance with some embodiments of the present disclosure.

FIG. 5C illustrates a cross-sectional view of another semiconductor structure similar to the semiconductor structure shown in FIGS. 5A and 5B. The grating coupler 200a illustrated in FIG. 5C is similar to the grating coupler 200 illustrated in FIG. 5B except that in the embodiment, the sidewalls 2241W' of the gaps 2241G may be step-shaped. The mode field matching between the grating region and the optical fiber may be further enhanced by the step-shaped sidewalls 2241W', and the amount of diffracted light directed to the optical fiber may be further increased. In some embodiments, more steps may be formed on a sidewall of a gap between modulating patterns of a larger size.

Figure 6:
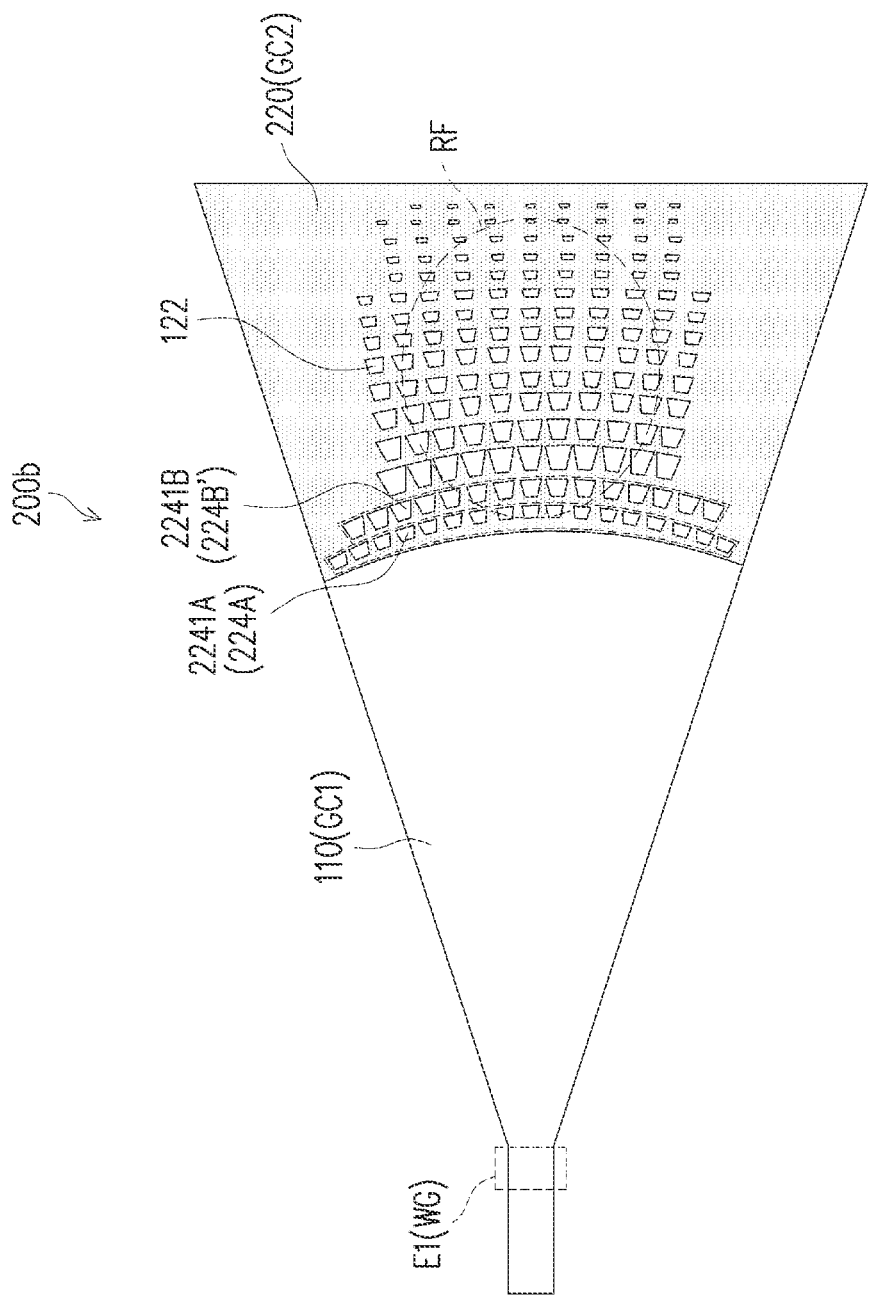
FIG. 6 is a schematic view of a semiconductor structure in accordance with some embodiments of the present disclosure.

FIG. 6 is a schematic view of a semiconductor structure in accordance with some embodiments of the present disclosure. The grating coupler 200b illustrated in FIG. 6 is similar to the grating coupler 200 illustrated in FIG. 5A except that in the embodiment, the number of the first modulating patterns 2241A in the first row of modulating patterns 224A is different from the number of the second modulating patterns 2241B in the second row of modulating patterns 224B'. As shown in FIG. 6, the number of the second modulating patterns 2241B in the second row of modulating patterns 224B' may be less than the number of the first modulating patterns 2241A in the first row of modulating patterns 224A.

Figure 7:
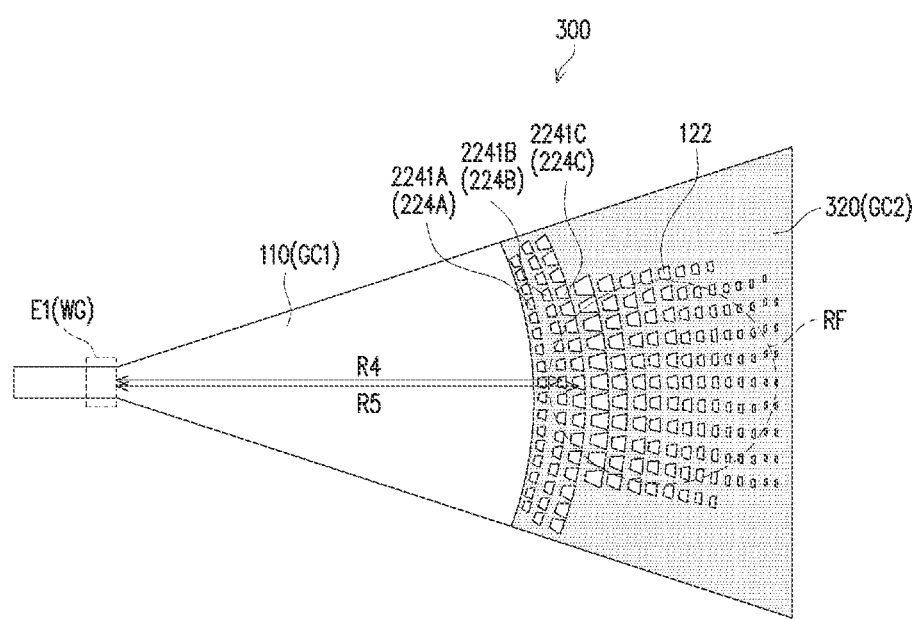
FIG. 7 is a schematic view of a semiconductor structure in accordance with some embodiments of the present disclosure.

FIG. 7 is a schematic view of a semiconductor structure in accordance with some embodiments of the present disclosure. The grating coupler 300 illustrated in FIG. 6 is similar to the grating coupler 200 illustrated in FIG. 5A except that in the embodiment, the grating portion 320 further include a third row of modulating patterns 224C. As shown in FIG. 7, a fifth distance R5 between the third row of modulating patterns 224C and the waveguide WG is longer than the fourth distance R4 between the second row of modulating patterns 224B and the waveguide WG. A fifth size of a third modulating pattern 2241C in the third row of modulating patterns 224C may be larger than a fourth size of a second modulating pattern 2241B in the second row of modulating patterns 224B.

Figure 8A:
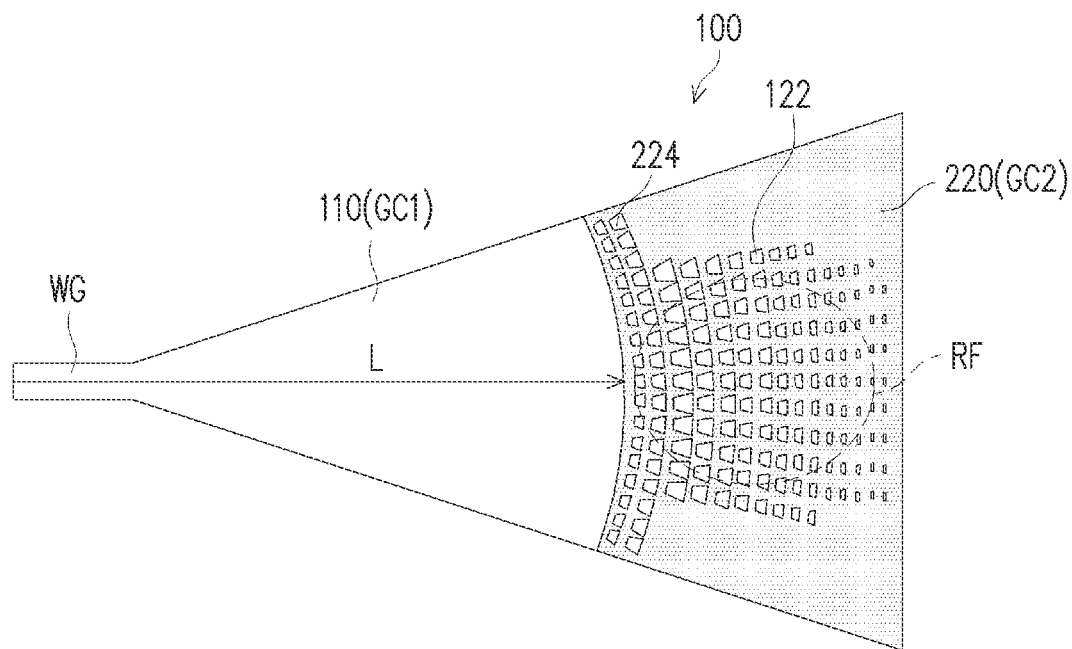
FIG. 8A schematically illustrates a light propagating in a semiconductor structure in accordance with some embodiments of the present disclosure.
Figure 8B:
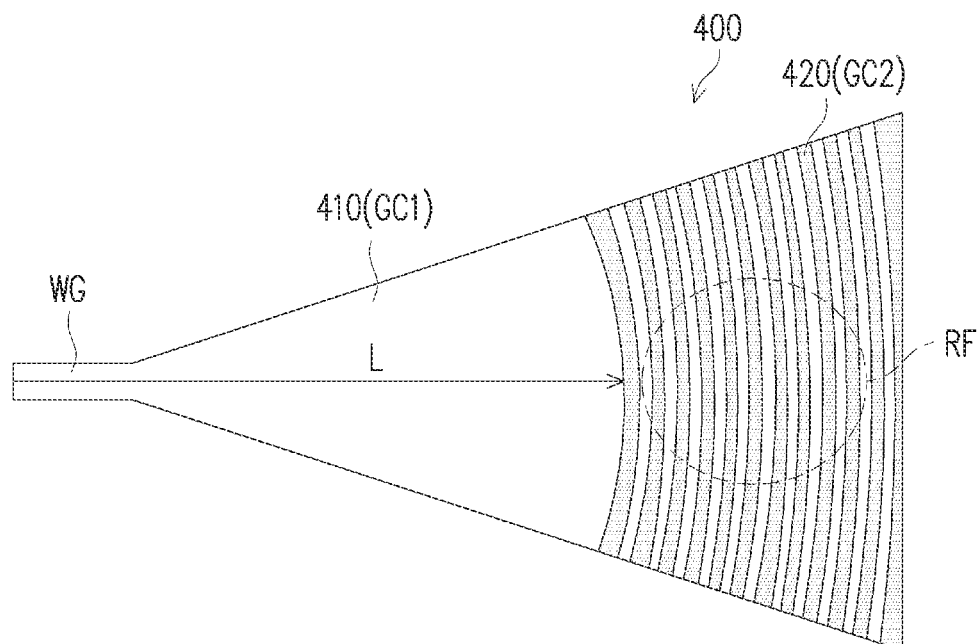
FIG. 8B schematically illustrates a light propagating in an exemplary semiconductor structure.
Figure 8C:
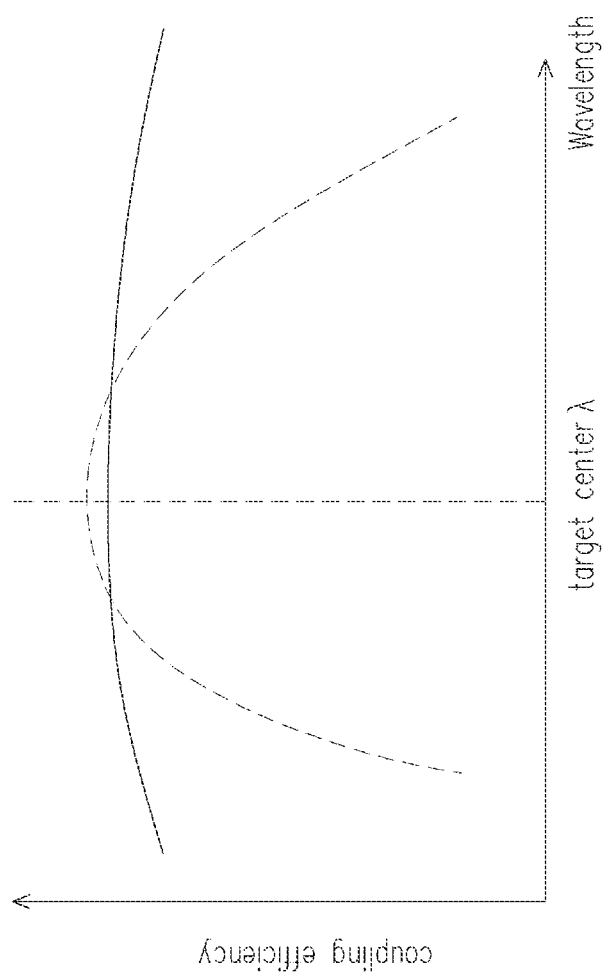
FIG. 8C illustrates the coupling efficiency of the semiconductor structure in FIG. 8A and FIG. 8B versus frequency.

FIG. 8A schematically illustrates a light propagating in a semiconductor structure in accordance with some embodiments of the present disclosure. FIG. 8B schematically illustrates a light propagating in an exemplary semiconductor structure. FIG. 8C illustrates the coupling efficiency of the semiconductor structures in FIG. 8A and FIG. 8B versus frequency. Referring to FIGS. 8A and 8B. As shown in FIG. 8A, optical signals L propagating in the waveguide WG enter the grating coupler 100. The optical signals L may pass through the taper portion 110 to the grating portion 120 and be emitted out substantially through the region RF on the grating portion 120. FIG. 8B shows an exemplary grating coupler 400 having a taper portion 410 and a grating portion 420 with strip-like grating structures. Similarly, as shown in FIG. 8B, optical signals L propagating in the waveguide WG enter the grating coupler 400. The optical signals L may pass through the taper portion 410 to the grating portion 420 and be emitted out substantially through the region RF on the grating portion 420.

The coupling efficiency of the grating coupler 100 with respect to the wavelength of the optical signals L is shown in solid line in FIG. 8C, and the coupling efficiency of the exemplary grating coupler 400 with respect to the wavelength of the optical signals L is shown in dashed line in FIG. 8C. It can be seen in FIG. 8C that grating coupler 100 may have a bandwidth significantly wider than that of the exemplary grating coupler 400.

The broad bandwidth feature of the grating coupler 100 may be useful when the grating couplers are used as I/Os for device testing process. In a device testing process, testing signals are inputted into device under test (DUT) and the results signals are outputted form DUT through a pair of I/O grating couplers, and a detected DUT spectrum may be acquired. Normally, an actual DUT spectrum is supposedly to be extracted from the detected DUT spectrum by deducting a calibration spectrum of a pair of calibration grating couplers, which is assumed to be identical with the pair of I/O grating couplers.

However, the spectrum of the pair of calibration grating couplers and the pair of I/O grating couplers may not be identical due to manufacturing process or temperature variation, and the wavelength shift between the I/O grating couplers and the calibration grating couplers may render distortion in the extracted DUT spectrum. By introducing the grating coupler with broad bandwidth as disclosed in the disclosure, the distortion of the extracted DUT spectrum may be reduced even if the pair of calibration grating couplers and the pair of I/O grating couplers are not be identical.

In the above-mentioned optical devices (100~300), the grating couplers may be arranged with rows of grating patterns that a row of grating patterns has smaller grating patterns or wider interval as the row of grating patterns being farther away from the waveguide. The grating couplers may also be arranged with grating structures that the ratio of the projection area of the grating patterns to the filling element is smaller for a grating structure farther away from the waveguide. The arrangements of the rows of grating patterns or the grating structures may provide a gradually decreasing effective refractive index, such that the light from waveguide may be more focused and the grating coupler may have a broader bandwidth.

In accordance with some embodiments of the disclosure, an optical device for coupling light propagating between a waveguide and an optical transmission component is provided. The optical device includes a taper portion and a grating portion. The taper portion is disposed between the grating portion and the waveguide. The grating portion includes rows of grating patterns. A first size of a first grating pattern in a first row of grating patterns is larger than a second size of a second grating pattern in a second row of grating patterns. A first distance between the first row of grating patterns and the waveguide is less than a second distance between the second row of grating patterns and the waveguide. In some embodiments, the grating patterns in one of the rows of grating patterns are arranged along an arc. In some embodiments, the grating patterns in the first row of grating patterns are of the same size. In some embodiments, a first projection area of the first grating pattern on a substrate of the optical device is larger than a second projection area of the second grating pattern on the substrate of the optical device. In some embodiments, the first grating pattern is aligned to an adjacent grating pattern in an adjacent row of grating patterns. In some embodiments, pitches between each one of the grating patterns and an adjacent grating pattern in the first row of grating patterns are fixed. In some embodiments, a first pitch between the first grating pattern and an adjacent grating pattern in the first row of grating patterns is smaller than a second pitch between the second grating pattern and an adjacent grating pattern in the second row of grating patterns. In some embodiments, the grating portion further includes rows of modulating patterns disposed between the taper portion and the rows of grating patterns. A third size of a first modulating pattern in a first row of modulating patterns is smaller than a fourth size of a second modulating pattern in a second row of modulating patterns. A third distance between the first row of modulating patterns and the waveguide is less than a fourth distance between the second row of modulating patterns and the waveguide.

In accordance with some embodiments of the disclosure, an optical device including a waveguide and a grating portion is provided. The grating portion includes rows of grating patterns. A first interval between first rows of grating patterns among the rows of grating patterns is smaller than a second interval between second rows of grating patterns among the rows of grating patterns. A first distance between the first rows of grating patterns and the waveguide is less than a second distance between the second rows of grating patterns and the waveguide. In some embodiments, the optical device further includes a taper portion disposed between the grating portion and the waveguide. The taper portion connects to the waveguide at a first edge. In some embodiments, the taper portion has a second edge opposite to the first edge. The second edge is an arc-shaped edge. In some embodiments, the grating patterns in the first rows of grating patterns are arranged along an arc.

In accordance with some embodiments of the disclosure, a device for receiving light from or outputting light to an optical fiber is provided. The device includes a light-guiding material layer and a filling element. The light-guiding material layer has an upper surface facing the optical fiber. The light-guiding material layer includes a waveguide and a grating coupler. An end portion of the waveguide is arranged along a first direction. A grating coupler. Includes a first portion and a second portion. The first portion optically coupled to the end portion of the waveguide. The second portion optically coupled to the first portion and the optical fiber. The second portion includes a first grating structure and a second grating structure. The first grating structure and the second grating structure arranged side-by-side with each other along the first direction. Each of the first and second grating structure includes a row of grating patterns. The filling element is filled in gaps between the grating patterns. A first ratio of a sum of projection areas of the grating patterns on the upper surface to a projection area of the filling element on the upper surface of the first grating structure is greater than a second ratio of a sum of projection areas of the grating patterns on the upper surface to a projection area of the filling element on the upper surface of the second grating structure. A first distance between the first grating structure and the end portion of the waveguide is less than a second distance between the second grating structure and the end portion of the waveguide. In some embodiments, each of the first and second grating structures has an arc-shaped edge. In some embodiments, the grating patterns in the row of grating patterns of the first grating structure are arranged along the arc-shaped edge of the first grating structure. In some embodiments, the refractive index of the filling element is smaller than the refractive index of the light-guiding material layer. In some embodiments, a first effective refractive index of the first grating structure is larger than a second effective refractive index of the second grating structure. In some embodiments, the second portion further including a first modulating structure and a second modulating structure disposed between the first portion and the first grating structure. The first modulating structure includes a first row of modulating patterns. The second modulating structure includes a second row of modulating patterns. A third size of a first modulating pattern in the first row of modulating patterns is smaller than a fourth size of a second modulating pattern in the second row of modulating patterns. A third distance between the first modulating structure and the end portion of the waveguide is less than a fourth distance between the second modulating structure and the end portion of the waveguide. In some embodiments, the filling element fills in gaps between the modulating patterns. In some embodiments, a third ratio of a sum of projection areas of the modulating patterns on the upper surface to a projection area of the filling element on the upper surface of the first modulating structure is smaller than a fourth ratio a sum of projection areas of the modulating patterns on the upper surface to a projection area of the filling element on the upper surface of the second modulating structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device for coupling light propagating between a waveguide and an optical transmission component, the optical device comprising:
   a taper portion; and
   a grating portion, the taper portion being disposed between the grating portion and the waveguide, the grating portion comprising:
   rows of grating patterns, and a first size of a first grating pattern a first xi of grating patterns is larger than a second size of a second grating pattern in a second row of grating patterns, wherein the first grating pattern and the second grating pattern are trapezoid-shape patterns, and a first distance between the first row of grating patterns and the waveguide is less than a second distance between the second row of grating patterns and the waveguide.

2. The optical device as claimed in claim 1, wherein the grating patterns in one of the rows of grating patterns are arranged along an arc.

3. The optical device as claimed in claim 1, wherein the grating patterns in the first row of grating patterns are of the same size.

4. The optical device as claimed in claim 1, wherein each of the grating patterns in the first row of grating patterns is trapezoid-shape pattern.

5. The optical device as claimed in claim 1, wherein the first grating pattern is aligned to an adjacent grating pattern in ail adjacent row of grating patterns.

6. The optical device as claimed in claim 1, wherein pitches between each one of the grating patterns and an adjacent grating pattern in the first row of grating patterns are fixed.

7. The optical device as claimed in claim 1, wherein a first pitch between the first grating pattern and an adjacent grating pattern in the first row of grating patterns is smaller than a second pitch between the second grating pattern and an adjacent grating pattern in the second row of grating patterns.

8. The optical device as claimed in claim 1, wherein the grating portion further comprises rows of modulating patterns disposed between the taper portion and the rows of grating patterns, wherein a third size of a first modulating pattern in a first row of modulating patterns is smaller than a fourth size of a second modulating pattern in a second row of modulating patterns, wherein a third distance between the first row of modulating patterns and the waveguide is less than a fourth distance between the second row of modulating patterns and the waveguide.

9. An optical device, comprising:
a waveguide,
a grating portion, the grating portion comprising:
rows of grating patterns, and a first interval between first rows of grating patterns among the rows of grating patterns is smaller than a second interval between second rows of grating patterns among the rows of grating patterns, wherein at least one of the grating patterns is trapezoid-shape pattern, and a first distance between the first rows of grating patterns and the waveguide is less than a second distance between the second rows of grating patterns and the waveguide.

10. The optical device as claimed in claim 9, wherein the optical device further comprises a taper portion disposed between the grating portion and the waveguide, wherein the taper portion connects to the waveguide at a first edge.

11. The optical device as claimed in claim 10, wherein the taper portion has a second edge opposite to the first edge, and the second edge is an arc-shaped edge.

12. The optical device as claimed in claim 9, wherein the grating patterns in one of the first rows of grating patterns are arranged along an arc.

13. A device for receiving light from or outputting light to an optical fiber, the device comprising:
a light-guiding material layer, having an upper surface facing the optical fiber, the light-guiding material layer comprising:
a waveguide, wherein an end portion of the waveguide is arranged along a first direction, and
a grating coupler, comprising:
a first portion, optically coupled to the end portion of the waveguide; and
a second portion, optically coupled to the first portion and the optical fiber, the second portion comprising:
a first grating structure and a second grating structure, arranged side-by-side with each other along the first direction, wherein each of the first and second grating structure comprises a row of grating patterns, and projection areas of the grating patterns of the first grating structure on the upper surface are trapezoid-shaped areas; and
a filling element, filled in gaps between the grating patterns;
wherein a first ratio of a sum of projection areas of the grating patterns on the upper surface to a projection area of the filling element on the upper surface of the first grating structure is greater than a second ratio of a sum of projection areas of the grating patterns on the upper surface to a projection area of the filling element on the upper surface of the second grating structure, wherein a first distance between the first grating structure and the end portion of the waveguide is less than a second distance between the second grating structure and the end portion of the waveguide.

14. The device as claimed in claim 13, wherein each of the first and second grating structures has an arc-shaped edge.

15. The device as claimed in claim 14, wherein the grating patterns in the row of grating patterns of the first grating structure are arranged along the arc-shaped edge of the first grating structure.

16. The device as claimed in claim 13, wherein the refractive index of the filling element is smaller than the refractive index of the light-guiding material layer.

17. The device as claimed in claim 13, wherein a first effective refractive index of the first grating structure is larger than a second effective refractive index of the second grating structure.

18. The device as claimed in claim 13, wherein the second portion further comprises a first modulating structure and a second modulating structure disposed between the first portion and the first grating structure; wherein the first modulating structure comprises a first row of modulating patterns, and the second modulating structure comprises a second row of modulating patterns, and a third size of a first modulating pattern in the first row of modulating patterns is smaller than a fourth size of a second modulating pattern in the second row of modulating patterns, wherein a third distance between the first modulating structure and the end portion of the waveguide is less than a fourth distance between the second modulating structure and the end portion of the waveguide.

19. The device as claimed in claim 18, wherein the filling element fills in gaps between the modulating patterns.

20. The device as claimed in claim 19, wherein a third ratio of a sum of projection areas of the modulating patterns on the upper surface to a projection area of the filling element on the upper surface of the first modulating structure is smaller than a fourth ratio of a sum of projection areas of the modulating patterns on the upper surface to a projection area of the filling element on the upper surface of the second modulating structure.

* * * * *